United States Patent
Moravek et al.

(10) Patent No.: US 9,969,900 B2
(45) Date of Patent: May 15, 2018

(54) METHODS OF IMPROVING BURNISH RESISTANCE USING CURABLE FILM-FORMING COMPOSITIONS DEMONSTRATING BURNISH RESISTANCE AND LOW GLOSS

(71) Applicant: PPG INDUSTRIES OHIO, INC., Cleveland, OH (US)

(72) Inventors: Scott J. Moravek, Mars, PA (US); Shantilal Mohnot, Murrysville, PA (US); Stephen John Thomas, Aspinwall, PA (US)

(73) Assignee: PPG industries Ohio, Inc., Cleveland, OH (US)

( * ) Notice: Subject to any disclaimer, the term of this patent is extended or adjusted under 35 U.S.C. 154(b) by 37 days.

(21) Appl. No.: 14/568,712

(22) Filed: Dec. 12, 2014

(65) Prior Publication Data

US 2015/0099129 A1    Apr. 9, 2015

Related U.S. Application Data

(63) Continuation-in-part of application No. 13/611,292, filed on Sep. 12, 2012, now abandoned.

(51) Int. Cl.
*B05D 5/02* (2006.01)
*C09D 175/04* (2006.01)
*C09D 4/00* (2006.01)

(52) U.S. Cl.
CPC ............. *C09D 175/04* (2013.01); *C09D 4/00* (2013.01); *Y10T 428/31551* (2015.04)

(58) Field of Classification Search
CPC .. Y10T 428/31551; C09D 4/00; C09D 175/04
USPC ....................................................... 427/387
See application file for complete search history.

(56) References Cited

U.S. PATENT DOCUMENTS

| | | | |
|---|---|---|---|
| 5,703,155 A | 12/1997 | Swarup et al. | |
| 6,344,520 B1 | 2/2002 | Greene | |
| 6,387,519 B1 | 5/2002 | Anderson et al. | |
| 6,593,417 B1 | 7/2003 | Anderson et al. | |
| 7,056,449 B2 * | 6/2006 | Hoefler | C01B 33/1417 252/8.57 |
| 7,816,442 B2 | 10/2010 | Christian et al. | |
| 7,842,129 B2 | 11/2010 | Christian et al. | |
| 2004/0249049 A1 | 12/2004 | Christian et al. | |
| 2005/0282022 A1 | 12/2005 | Christian et al. | |
| 2008/0021147 A1 | 1/2008 | Lin | |
| 2008/0139756 A1 | 6/2008 | Christian et al. | |
| 2008/0207842 A1 | 8/2008 | Barthel et al. | |
| 2008/0213488 A1 | 9/2008 | Stanjek et al. | |
| 2009/0286901 A1 | 11/2009 | Vijverberg et al. | |
| 2010/0063187 A1 | 3/2010 | Briehn et al. | |

FOREIGN PATENT DOCUMENTS

| | | |
|---|---|---|
| EP | 1388581 B1 | 6/2007 |
| JP | 4255765 | 9/1992 |
| JP | 2005-153471 | 6/2005 |
| JP | 2005-313630 | 11/2005 |
| JP | 2007-098883 | 4/2007 |
| TW | I296566 B | 5/2008 |

OTHER PUBLICATIONS

Zhu et al. "How to Prepare Reproducible, Homogeneous, and Hydrolytically Stable Aminosilane-derived Layers on Silica" Langmuir Jan. 2012, 28(1): 416-423.*

* cited by examiner

*Primary Examiner* — Robert S Walters, Jr.
(74) *Attorney, Agent, or Firm* — Krisanne Shideler

(57) ABSTRACT

The present invention is directed to methods of improving burnish resistance of substrates comprising:
(1) applying to at least a portion of the substrate a curable film-forming composition comprising:
 (a) a polymeric binder comprising at least one polymeric resin having reactive functional groups;
 (b) a curing agent containing functional groups that are reactive with the reactive functional groups of (a); and
 (c) silica particles that have been functionalized on their surfaces with an amino silane so as to impart the surfaces with primary amino functional groups; and
(2) (a) heating the coated substrate to a temperature and for a time sufficient to cure the curable film-forming composition or (b) allowing a time sufficient to cure the curable film-forming composition under ambient conditions. The present invention is further directed to solventborne, curable film-forming compositions comprising the components (a) (b) and (c) above.

19 Claims, No Drawings

METHODS OF IMPROVING BURNISH RESISTANCE USING CURABLE FILM-FORMING COMPOSITIONS DEMONSTRATING BURNISH RESISTANCE AND LOW GLOSS

CROSS-REFERENCE TO RELATED APPLICATIONS

This application is a continuation-in-part of U.S. patent application Ser. No. 13/611,292, filed on Sep. 12, 2012, and entitled "CURABLE FILM-FORMING COMPOSITIONS DEMONSTRATING BURNISH RESISTANCE AND LOW GLOSS", which is incorporated herein by reference in its entirety.

FIELD OF THE INVENTION

The present invention relates generally to methods of improving burnish resistance using curable film-forming compositions that demonstrate burnish resistance and low gloss properties.

BACKGROUND OF THE INVENTION

Recently a great deal of research effort in the coatings industry has been focused on mar and abrasion resistance of transparent coatings. While these two terms are often used interchangeably, the physical and mechanistic events are quite different. Mar is a near-surface phenomenon involving small scratches, usually without significant removal of material. Abrasion involves much more severe damage and often entails significant loss of coating material. As such, mar resistance is influenced primarily by surface properties while abrasion resistance is controlled by bulk properties. The chemical attributes that influence these mechanical properties are often divergent. For example, acrylic urethane clearcoats can have excellent abrasion resistance but poor mar resistance. On the other hand, acrylic melamine coatings can have good mar resistance and average to poor abrasion resistance. One common example of mar damage is gloss loss on an automobile finish. The high gloss finish of a new car becomes dull and hazy with time due to fine scratches and abrasions. The majority of this damage is caused by the scrubbing action of cloths or bristles used in automatic car washes. Abrasion damage is more commonly seen in floor coatings, and in its most severe form the substrate may become exposed. Burnishing of highly pigmented coatings is less well defined in the literature but contains elements of mar and abrasion as well as interfacial adhesion. There are at least four different wearing mechanisms that can contribute to burnishing in coatings containing fillers or pigments. 1) Removal of film at the air/surface interface, 2) abstraction of the filler by cohesive binder failure, 3) abstraction of filler by adhesive failure and/or 4) filler wear. Which mechanism predominates may vary depending on the coating, abrasion conditions and outdoor exposure. Ideally a burnish resistant coating has good abrasion resistance, good mar resistance, and pigment particles with excellent compatibility with the binder.

Camouflage aircraft typically utilize low gloss pigmented coatings to achieve many of their performance requirements. These low gloss or matte finishes exhibit physically rough surfaces, which, ideally, diffusely reflect visible light. These physically rough surfaces are difficult to clean and often require scrubbing with an abrasive pad, which over time can increase the uniformity of coating reflectance, called burnishing. The increase in reflection is perceived visually as a color shift resulting in areas of higher contrast. Mechanically, this increase in gloss or burnishing is caused by abrasion of the rough paint surface producing a smoother surface with more uniform reflection.

It would be desirable to develop curable film-forming compositions which can be repeatedly cleaned with detergents and abrasives without increasing the reflectance of the coating, to be used in methods of improving the burnish resistance of metal substrates.

SUMMARY OF THE INVENTION

The present invention is directed to a method of improving burnish resistance of a substrate, comprising:

(1) applying to at least a portion of the substrate a curable film-forming composition comprising:

(a) a polymeric binder comprising at least one polymeric resin having reactive functional groups;

(b) a curing agent containing functional groups that are reactive with the reactive functional groups of (a) and selected from the group consisting of polyisocyanates, aminoplasts, and combinations thereof; and (c) functionalized silica particles that have been reacted on theft surfaces with an amino silane so as to impart the surfaces with primary amino functional groups, wherein the functionalized silica particles are prepared from a reaction mixture consisting essentially of fumed or precipitated silica and an amino silane; and (2) (a) heating the coated substrate to a temperature and for a time sufficient to cure the curable film-forming composition or (b) allowing a time sufficient to cure the curable film-forming composition under ambient conditions.

The present invention is further directed to a method of improving burnish resistance of a substrate, comprising:

(1) applying to at least a portion of the substrate a first curable film-forming composition to form a colored base coat;

(2) applying a second, transparent, film-forming composition on top of the base coat to form a clear top coat, wherein the transparent film-forming composition comprises a curable film-forming composition comprising:

(a) a polymeric binder comprising at least one polymeric resin having reactive functional groups;

(b) a curing agent containing functional groups that are reactive with the reactive functional groups of (a) and selected from the group consisting of polyisocyanates, aminoplasts, and combinations thereof; and (c) functionalized silica particles that have been reacted on their surfaces with an amino silane so as to impart the surfaces with primary amino functional groups, wherein the functionalized silica particles are prepared from a reaction mixture consisting essentially of fumed or precipitated silica and an amino silane; and (3) (a) heating the coated substrate to a temperature and for a time sufficient to cure the second curable film-forming composition or (b) allowing a time sufficient to cure the second curable film-forming composition under ambient conditions.

The present invention is further directed to the curable film-forming composition described above, in particular, a solventborne curable film-forming composition, used in the method of the present invention.

DETAILED DESCRIPTION OF THE INVENTION

It is noted that, as used in this specification and the appended claims, the singular forms "a," "an," and "the" include plural referents unless expressly and unequivocally limited to one referent.

Other than in the operating examples, or where otherwise indicated, all numbers or expressions referring to quantities of ingredients, reaction conditions, etc., used in the specification and claims are to be understood as modified in all instances by the term "about". Various numerical ranges are disclosed in this patent application. Because these ranges are continuous, they include every value between the minimum and maximum values. Unless expressly indicated otherwise, the various numerical ranges specified in this application are approximations.

The various aspects and examples of the present invention as presented herein are each understood to be non-limiting with respect to the scope of the invention.

As used in the following description and claims, the following terms have the meanings indicated below:

The terms "acrylic" and "acrylate" are used interchangeably (unless to do so would alter the intended meaning) and include acrylic acids, anhydrides, and derivatives thereof, such as their C1-C5 alkyl esters, lower alkyl-substituted acrylic acids, e.g., C1-C5 substituted acrylic acids, such as methacrylic acid, ethacrylic acid, etc., and their C1-C5 alkyl esters, unless clearly indicated otherwise. The terms "(meth) acrylic" or "(meth)acrylate" are intended to cover both the acrylic/acrylate and methacrylic/methacrylate forms of the indicated material, e.g., a (meth)acrylate monomer.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

The term "burnish resistant" refers to an ability of a coating to maintain its gloss without demonstrating a significant increase (e.g., less than 15 units) in gloss after scrubbing with an abrasive material or pad.

The present invention is directed to methods of improving burnish resistance using curable film-forming compositions. The film-forming compositions comprise (a) a polymeric binder comprising at least one polymeric resin having reactive functional groups. Examples of reactive functional groups include hydroxyl groups, carbamate groups, carboxyl groups, isocyanate groups, carboxylate groups, primary amine groups, secondary amine groups, amide groups, urea groups, urethane groups, epoxy groups, and combinations thereof.

Particularly useful polymeric film-forming resins suitable as the polymeric binder (a) are acrylic polymers, polyesters, including alkyds, and polyurethanes. Generally these polymers can be any polymers of these types made by any method known to those skilled in the art where the polymers are water dispersible or emulsifiable and preferably of limited water solubility.

Suitable acrylic polymers include copolymers of one or more alkyl esters of acrylic add or methacrylic add, optionally together with one or more other polymerizable ethylenically unsaturated monomers. Useful alkyl esters of acrylic add or methacrylic add include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include hydroxyalkyl acrylates and metehacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl) acrylamides and N-(alkoxymethyl)methacrylamides.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated add functional monomer.

Useful ethylenically unsaturated, epoxy functional monomers used to prepare the beta-hydroxy ester functional monomers include, but are not limited to glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are preferred. Examples of carboxylic acids include, but are not limited to, saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic adds such as itaconic acid, maleic add and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl) phenyl glycidyl ether. Preferred glycidyl esters include those of the structure:

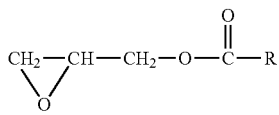

where R is a hydrocarbon radical containing from about 4 to about 26 carbon atoms. Preferably, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Carbamate functional groups can be included in the acrylic polymer by copolymerizing the acrylic monomers with a carbamate functional vinyl monomer, such as a carbamate functional alkyl ester of methacrylic add, or by reacting a hydroxyl functional acrylic polymer with a low molecular weight carbamate functional material, such as can be derived from an alcohol or glycol ether, via a transcarbamoylation reaction. Alternatively, carbamate functionality may be introduced into the acrylic polymer by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other useful carbamate functional monomers are disclosed in U.S. Pat. No. 5,098,947, which is incorporated herein by reference. Other useful carbamate functional monomers are disclosed in U.S. Pat. No. 5,098,947, which is incorporated herein by reference.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

Acrylic polymers can be prepared via aqueous emulsion polymerization techniques and used directly in the preparation of the aqueous coating compositions, or can be prepared via organic solution polymerization techniques with groups capable of salt formation such as acid or amine groups. Upon neutralization of these groups with a base or acid the polymers can be dispersed into aqueous medium. Generally any method of producing such polymers that is known to those skilled in the art utilizing art recognized amounts of monomers can be used.

In particular aspects of the present invention, the polymeric binder (a) comprises a mixture of two hydroxyl functional acrylic polymers. The first comprises a polymerization product of styrene, hydroxypropyl acrylate, isostearic acid, glycidyl methacrylate, and methyl methacrylate as referenced in U.S. Pat. No. 5,869,566, Examples 1-16, which is incorporated herein by reference while the second comprises a polymerization product of hydroxypropyl methacrylate, methyl methacrylate, n-butyl acrylate, styrene, Cardura E/acrylic acid adduct, and acrylic acid according to U.S. Pat. No. 6,458,885, which is incorporated herein by reference and the two are mixed in a weight ratio in the range of 1:1 to 3:1, respectively.

Besides acrylic polymers, the polymeric film-forming resin suitable as the polymeric binder (a) in the coating composition may be an alkyd resin or a polyester. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythrital. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Useful alkyd resins include polyesters of polyhydroxyl alcohols and polycarboxylic acids chemically combined with various drying, semi-drying and non-drying oils in different proportions. Thus, for example, the alkyd resins are made from polycarboxylic acids such as phthalic acid, maleic acid, fumaric acid, isophthalic acid, succinic acid, adipic acid, azeleic acid, sebacic acid as well as from anhydrides of such acids, where they exist. The polyhydric alcohols which can be reacted with the polycarboxylic acid include 1,4-butanediol, 1,6-hexanediol, neopentyl glycol, ethylene glycol, diethylene glycol and 2,3-butylene glycol, glycerol, trimethylolpropane, pentaerythritol, sorbitol and mannitol.

The alkyd resins are produced by reacting the polycarboxylic acid and the polyhydric alcohol together with a drying, semi-drying or non-drying oil in proportions depending upon the properties desired. The oils are coupled into the resin molecule by esterification during manufacturing and become an integral part of the polymer. The oil is fully saturated or predominately unsaturated. When cast into films, fully saturated oils tend to give a plasticizing effect to the film, whereas predominately unsaturated oils tend to crosslink and dry rapidly with oxidation to give more tough and solvent resistant films. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties as is well known in the art.

Carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups such as amide, thiol, urea, and thiocarbamate may be incorporated into the polyester or alkyd resin as desired using suitably functional reactants if available, or conversion reactions as necessary to yield the desired functional groups. Such techniques are known to those skilled in the art.

Polyurethanes can also be used as the polymeric binder (a) in the film-forming composition used in the method of the present invention. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. As with the polyesters, the polyurethanes can be prepared with unreacted carboxylic acid groups, which upon neutralization with bases such as amines allows for dispersion into aqueous medium.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Other functional groups such as amide, thiol, urea, and thiocarbamate may be incorporated into the polyurethane as desired using suitably functional reactants if available, or conversion reactions as necessary to yield the desired functional groups. Such techniques are known to those skilled in the art.

The amount of the polymer present in the polymeric binder (a) generally ranges from 10 to 90 percent by weight, such as 20 to 80 percent by weight, or 40 to 60 percent by weight, based on the total weight of resin solids (curing agent plus all polymers containing functional groups) in the film-forming composition.

The curable film-forming compositions used in the method of the present invention further comprise a curing agent (b) comprising functional groups that are reactive with the reactive functional groups of (a). The curing agent (b) may be selected from, for example, polyisocyanates and aminoplasts. Mixtures of curing agents may also be used.

Useful aminoplast resins are based on the addition products of formaldehyde with an amino- or amide-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541, which is hereby incorporated by reference.

The aminoplast resins often contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol.

The polyisocyanate which is utilized as a crosslinking agent can be prepared from a variety of isocyanate-containing materials. The polyisocyanate may be a blocked polyisocyanate, or more often is unblocked and the curable film-forming composition is prepared as a two-pack composition, curable at room temperature. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials which would unblock at elevated temperatures such as lower aliphatic alcohols including methanol, oximes such as methyl ethyl ketoxime, lactams such as caprolactam and pyrazoles such as dimethyl pyrazole.

Alternatively, the curing agent (b) comprises a polyisocyanate having free isocyanate functional groups and the curable film-forming composition is a two-package system.

The polyisocyanate may include a single trifunctional polyisocyanate or a mixture of two or more different trifunctional polyisocyanates, and may be selected from one or more polyisocyanates such as triisocyanates including isocyanurates.

Suitable trifunctional isocyanates include, but are not limited to, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the name CYTHANE 3160 by CYTEC Industries, Inc., DESMODUR N 3300, which is the isocyanurate of hexamethylene diisocyanate, and DESMODUR Z 4470, a trimer of isophorone diisocyanate, both available from Bayer Corporation. Specifically used polyisocyanates are cyclic isocyanates, particularly, isocyanurates of diisocyanates such as hexamethylene diisocyanate and isophorone diisocyanate.

The polyisocyanate may also be any of those disclosed above, chain extended with one or more polyamines and/or polyols using suitable materials and techniques known to those skilled in the art.

The amount of the curing agent (b) generally ranges from 10 to 90 percent by weight, or 20 to 80 percent by weight, or 30 to 60 percent by weight, based on the total weight of resin solids (curing agent plus all polymers containing functional groups) in the film-forming composition.

The curable film-forming compositions used in the method of the present invention further comprise (c) silica particles that have been functionalized on their surfaces with an aminosilane so as to impart the surfaces with primary amino functional groups. The silica particles may be fumed silica or precipitated silica. The silica particles may be made from wet processes; such silicas include precipitated silica or gel silica. Alternatively dry or thermal processes may be used to prepare fumed silica, arc silica or plasma silica. Fumed silica may be prepared from flame pyrolysis of silicon tetrachloride. Precipitated silica may be prepared by reacting an alkaline silicate solution with a mineral acid. For example, sulfuric acid and sodium silicate solutions may be added simultaneously to water under agitation. Precipitation is performed under alkaline conditions. The type of agitation, duration of precipitation, the addition rate of reactants, their temperature and concentration, and pH can vary the properties of the final precipitated silica. The formation of a gel stage is avoided by stirring at elevated temperatures. The resulting white precipitate is filtered, washed and dried in the manufacturing process.

Examples of aminosilanes that may be reacted with the silica to functionalize the surface thereof include aminopropyl trialkoxysilanes such as aminopropyltriethoxysilane, available from Dow Corning as Z-6011.

The amount of functionalized, silica particles (c) generally ranges from 5 to 25 percent by weight, or 10 to 25 percent by weight, or 15 to 20 percent by weight, based on the total weight of resin solids (curing agent plus all compounds containing functional groups) in the film-forming composition. The amount of silica may be based on the desired dry film thickness of the final coating film. For example, a thinner final film may require less silica (such as 5 to 10 percent by weight) in the curable film-forming composition than a thicker film, which may require more silica (such as 15 to 20 percent by weight) in the curable film-forming composition. In two-pack compositions, the silica particles are typically included with the polymeric binder (a).

Other optional ingredients, such as colorants, catalysts, plasticizers, anti-oxidants, thixotropic agents, hindered amine light stabilizers, UV light absorbers and stabilizers may be formulated into the curable compositions of the present invention. These ingredients may be present (on an individual basis) in amounts up to 10 percent, often from 0.1 to 5 percent by weight based on total weight of resin solids of the film-forming composition. When the composition of the present invention includes aminoplast curing agents, catalysts including add functional catalysts known to those skilled in the art as useful in aminoplast-cured compositions, such as para-toluenesulfonic acid, dodecylbenzene sulfonic acid, and the like, may be included as well.

The coatings used in the method of the present invention can also include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-mated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting aspect, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting aspects, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting aspect, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting aspect, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting aspect of the present invention, have minimal migration out of the coating. Example photosensitive corn positions and/or photochromic corn positions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

The curable film-forming compositions used in the method of the present invention may contain color pigments conventionally used in surface coatings and may be used as matte finish or "low gloss" monocoats; that is, low gloss pigmented coatings. By "low gloss" it is meant that the cured coating has an initial 85° gloss measurement of less than 30, often less than 20, as measured by standard techniques known to those skilled in the art. Such standard techniques include ASTM D523 for gloss measurement.

The curable film-forming compositions used in the method of the present invention are often solventborne. Suitable solvents include ketones, such as acetone, methyl ethyl ketone, methyl amyl ketone and methyl isobutyl ketone; aromatic hydrocarbons, such as xylene and toluene; glycol ethers, such as ethylene glycol monobutyl ether, diethylene glycol monobutyl ether, propylene glycol methyl ether, ethylene glycol monohexyl ether, and dipropylene glycol methyl ether; esters, including acetates such as n-butyl acetate, t-butyl acetate, methyl acetate, oxo-hexyl acetate, pentyl propionate, propylene glycol monomethyl ether acetate and 2-butoxyethyl acetate; solvent blends including aromatic blends and mineral spirits; solvents such as parachlorobenzotrifluoride and dimethyl carbonate; other solvents; and mixtures of any of the foregoing.

The curable film-forming compositions used in the method of the present invention may alternatively be used as a matte finish clear coat layer of a multi-layer composite coating composition, such as a color-plus-clear composite coating, as noted below.

The curable film-forming compositions used in the method of the present invention may be curable at ambient temperatures or elevated temperatures, depending on the crosslinking chemistry employed. The film-forming compositions of the present invention are most suitable as topcoats, in particular, clear coats and monocoats, by virtue of their matte finish and burnish-resistant properties as discussed below. The compositions may be easily prepared by simple mixing of the ingredients, using formulation techniques well known in the art.

The compositions used in the method of the present invention may be applied over any of a variety of substrates such as metallic, glass, wood, and/or polymeric substrates, and can be applied by conventional means including but not limited to brushing, dipping, flow coating, spraying and the like. They are most often applied by spraying. The usual spray techniques and equipment for air spraying, airless spraying, and electrostatic spraying employing manual and/or automatic methods can be used. Suitable substrates include but are not limited to metal substrates such as ferrous metals, zinc, copper, magnesium, aluminum, aluminum alloys, and other metal and alloy substrates typically used in the manufacture of automobile and other vehicle bodies. The ferrous metal substrates may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used.

The compositions used in the method of the present invention may also be applied over elastomeric, plastic, or composite substrates such as those that are found on motor vehicles. By "plastic" is meant any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon, and the like. By "composite" is meant any substrate consisting of fibers, typically of glass or carbon, or other filler material that is incorporated with polymeric or plastic materials, commonly of epoxy type polymers.

The curable film-forming composition used in the method of the present invention can be applied to the substrate or on top of a basecoat by any conventional coating technique, including, but not limited to, any of those disclosed above. The transparent topcoat can be applied to a cured or to a dried basecoat before the basecoat has been cured. In the latter instance, the two coatings can then be heated to cure both coating layers simultaneously.

Typically the curable film-forming composition is applied so as to yield a dry film thickness of 0.5 to 10 mils, such as 1.5 to 2.5 mils (about 38 to 64 micrometers).

Where the basecoat is not formed from a composition described above (but the topcoat is formed from a curable coating composition described above) the coating composition of the basecoat in the color-plus-clear system can be any composition useful in coatings applications, particularly automotive applications. The coating composition of the basecoat can comprise a resinous binder and a pigment and/or other colorant, as well as optional additives well known in the art of coating compositions. Nonlimiting examples of resinous binders are acrylic polymers, polyesters, alkyds, and polyurethanes.

The basecoat compositions can be applied to any of the substrates described above by any conventional coating techniques such as those described above, but are most often applied by spraying. The usual spray techniques and equipment for air spraying, airless spray, and electrostatic spraying employing either manual or automatic methods can be used. Resultant film thicknesses may vary as desired.

After forming a film of the basecoat on the substrate, the basecoat can be cured or alternatively given a drying step in which at least some of the solvent is driven out of the basecoat film by heating or an air drying period before application of the clearcoat. Suitable drying conditions may depend, for example, on the particular basecoat composition, and on the ambient humidity if the composition is water-borne.

The transparent or clear topcoat composition can be applied to the basecoat by any conventional coating technique, including, but not limited to, any of those disclosed above. The transparent topcoat can be applied to a cured or to a dried basecoat before the basecoat has been cured. In the latter instance, the two coatings can then be heated to cure both coating layers simultaneously.

A second topcoat coating composition can be applied to the first topcoat to form a "clear-on-clear" topcoat. The first topcoat coating composition can be applied over the basecoat as described above. The second topcoat coating composition can be applied to a cured or to a dried first topcoat before the basecoat and first topcoat have been cured. The basecoat, the first topcoat and the second topcoat can then be heated to cure the three coatings simultaneously.

It should be understood that the second transparent topcoat and the first transparent topcoat coating compositions can be the same or different provided that, when applied wet-on-wet, one topcoat does not substantially interfere with the curing of the other, for example, by inhibiting solvent/water evaporation from a lower layer. Moreover, both the first topcoat and the second topcoat can be the curable coating composition described above. Alternatively, only the second topcoat may be formed from the curable coating composition described above.

If the first topcoat does not comprise the curable coating composition described above, it may, for example, include any crosslinkable coating composition comprising a thermosettable coating material and a curing agent.

Typically, after forming the first topcoat over the basecoat, the first topcoat is given a drying step in which at least some solvent is driven out of the film by heating or, alternatively, an air drying period or curing step before application of the second topcoat. Suitable drying conditions will depend on the particular film-forming compositions used.

The second topcoat coating composition can be applied as was described above for the first topcoat by any conventional coating application technique. Curing conditions can be those described above for the topcoat.

The curable film-forming compositions used in the method of the present invention, after being applied to a substrate as a coating and after curing, demonstrate an initial 85° gloss of less than 30, such as less than 20 or less than 10, and an increase in 85° gloss of no more than 10 gloss units, or no more than 5 gloss units, when subjected to WET ABRASION TEST METHOD ONE. In certain aspects of the present invention, the curable film-forming compositions will even demonstrate a decrease in gloss after subjection to the abrasion test Additionally, in certain aspects of the present invention, the curable film-forming compositions, after being applied to a substrate as a coating and after curing, demonstrate an initial 85° gloss of less than 30, such as less than 20 or less than 10, and an increase in 85° gloss of no more than 15 gloss units, or no more than 10 gloss units, when subjected to WET ABRASION TEST METHOD TWO. In certain aspects of the present invention, the curable film-forming compositions will even demonstrate a decrease in gloss after subjection to the abrasion test.

Each of the WET ABRASION TEST METHODS ONE and TWO corresponds, respectively, to the Amtec-Kistler Car Wash Test DIN 55668, run at 10 or 40 cycles, respectively, in the WET ABRASION TESTS ONE and TWO, a cured coating on a substrate is subjected to testing by first measuring the 85° gloss of the coating ("original gloss").

The coating is then subjected to the Amtec-Kistler Car Wash Test DIN 55668, run at 10 or 40 cycles, and afterward, the 85° gloss is again measured.

The curable film-forming compositions used in the method of the present invention, after being applied to a substrate as a coating and after curing, demonstrate an initial 85° gloss of less than 30, such as less than 20 or less than 10, and an increase in 85° gloss of no more than 15 gloss units, or no more than 10 gloss units, when subjected to DRY ABRASION TEST METHOD ONE. Additionally, in certain aspects of the present invention, the curable film-forming compositions, after being applied to a substrate as a coating and after curing, demonstrate an initial 85° gloss of less than 30, such as less than 20 or less than 10, and an increase in 85° gloss of no more than 15 gloss units, or no more than 10 gloss units, when subjected to DRY ABRASION TEST METHOD TWO.

Each of the DRY ABRASION TEST METHODS ONE and TWO are carried out such that the coating is linearly scratched with a weighted abrasive paper for ten double rubs using an Atlas AATCC CROCKMETER, Model CM-5, available from Atlas Electric Devices Company of Chicago, Ill. The abrasive paper used is 3M 281Q WETORDRY™ PRODUCTION™ 2 and 9 micron polishing paper sheets for DRY ABRASION TEST METHODS ONE and TWO respectively, which are commercially available from 3M Company of St. Paul, Minn. In the DRY ABRASION TESTS ONE and TWO, a cured coating on a substrate is subjected to testing by first measuring the 85° gloss of the coating ("original gloss"). The coating is then subjected to DRY ABRASION TESTS ONE and TWO, and afterward, the 85° gloss is again measured.

Given their unique properties, the curable film-forming compositions described above are particularly suitable for use in a method of improving burnish resistance of a substrate in accordance with the present invention. The method comprises: (1) applying to the substrate a curable film-forming composition to form a coated substrate, and (2) (a) heating the coated substrate to a temperature and for a time sufficient to cure the curable film-forming composition or (b) allowing a time sufficient to cure the curable film-forming composition under ambient conditions. The curable film-forming composition comprises any of those described above and forms the outermost layer, or topcoat, on the coated substrate.

Each of the aspects and characteristics described above, and combinations thereof, may be said to be encompassed by the present invention. For example, the present invention is thus drawn to the following nonlimiting aspects: In a first aspect a method of improving burnish resistance of a substrate is provided, comprising:

(1) applying to at least a portion of the substrate a curable film-forming composition to form a coated substrate, wherein the curable film-forming composition comprises:

(a) a polymeric binder comprising at least one polymeric resin having reactive functional groups;

(b) a curing agent containing functional groups that are reactive with the reactive functional groups of (a) and selected from the group consisting of polyisocyanates, aminoplasts, and combinations thereof; and (c) functionalized silica particles that have been reacted on their surfaces with an amino silane so as to impart the surfaces with primary amino functional groups, wherein the functionalized silica particles are prepared from a reaction mixture consisting essentially of fumed or precipitated silica and an amino silane; and (2) (a) heating the coated substrate to a temperature and for a time sufficient to cure the curable film-forming composition or (b) allowing a time sufficient to cure the curable film-forming composition under ambient conditions.

In a second aspect a method of improving burnish resistance of a substrate is provided, comprising:

(1) applying to at least a portion of the substrate a first curable film forming composition to form a colored base coat;

(2) applying a second, transparent, film-forming composition on top of the base coat to form a clear top coat, wherein the transparent film-forming composition comprises a curable film-forming composition comprising:

(a) a polymeric binder comprising at least one polymeric resin having reactive functional groups;

(b) a curing agent containing functional groups that are reactive with the reactive functional groups of (a) and selected from the group consisting of polyisocyanates, aminoplasts, and combinations thereof; and (c) functionalized silica particles that have been reacted on their surfaces with an amino silane so as to impart the surfaces with primary amino functional groups, wherein the functionalized silica particles are prepared from a reaction mixture consisting essentially of fumed or precipitated silica and an amino silane; and (3) (a) heating the coated substrate to a temperature and for a time sufficient to cure the second curable film-forming composition or (b) allowing a time sufficient to cure the second curable film-forming composition under ambient conditions.

In a third aspect in the method of any of the foregoing aspects, the amino functionalized silica particles are present in the topmost curable film-forming composition in an amount of 5 to 25 percent by weight, based on the total weight of resin solids in the topmost curable film-forming composition.

In a fourth aspect in the method of any of the foregoing aspects, the reactive functional groups in the polymeric resin of the polymeric binder (a) are selected from the group consisting of hydroxyl groups, carbamate groups, carboxyl groups, isocyanate groups, carboxylate groups, primary amine groups, secondary amine groups, amide groups, urea groups, urethane groups, epoxy groups, and combinations thereof.

In a fifth aspect in the method of the fourth aspect above, the polymeric binder of (a) comprises at least one hydroxyl functional acrylic and/or polyester polymer.

In a sixth aspect in the method of any of the foregoing aspects, the after application to the substrate as a coating and after curing, the topmost curable film-forming composition demonstrates an initial 85° gloss of less than 30 and an increase in 85' gloss of no more than 10 gloss units or no more than 5 gloss units when subjected to WET ABRASION TEST METHOD ONE.

In a seventh aspect in the method of any of the foregoing aspects, the curing agent comprises a polyisocyanate having free isocyanate functional groups and the topmost curable film-forming composition is a two-package system which is curable at ambient conditions.

In an eighth aspect in the method of the seventh aspect above, the curing agent comprises a mixture polyisocyanates derived from isophorone diisocyanate and hexamethylene diisocyanate.

In a ninth aspect in the method of any of the foregoing aspects, after application to the substrate as a coating and after curing, the topmost curable film-forming composition demonstrates an initial 85° gloss of less than 30 and an increase in 85° gloss of no more than 15 gloss units when subjected to WET ABRASION TEST METHOD TWO.

In a tenth aspect in the method of any of the foregoing aspects, the topmost curable film-forming composition is solventborne.

In an eleventh aspect in the method of any of the foregoing aspects, the functionalized silica particles are prepared from a reaction mixture consisting essentially of precipitated silica and an amino silane.

The present invention is more particularly described in the following examples, which are intended to be illustrative only, since numerous modifications and variations therein will be apparent to those skilled in the art. Unless otherwise specified, all parts and percentages are by weight.

Example A

This example describes the preparation of aminosilane treated silica flatting agent.

Hi-Sil 2000P, a precipitated silica product (BET surface area of 225 $m^2$/g) of PPG Industries, was milled and classified to a volume median particle size (measured by Beckman Coulter LS 230 instrument) of 10 micron and a maximum particle size of 22.5 micron. This silica was treated with 16% amino propyl triethoxy silane (Z-6011 by Dow Corning, also called 3-triethoxysilylpropylamine and its chemical formula is $H_2N(CH_2)_3Si(OC_2H_5)_3$) by blending it in a Waring blender continuously with silane pumped at uniform rate for five minutes with a Masterflex pump fitted with Viton tubing. The uniform blend was subjected to 120 degree Celsius for two hours in a convection oven. The silica sample, after amine silane reaction, had 2.3% carbon, 2.1% moisture, 267 ml dibutyl phthalate/100 g oil absorption, 189 $m^2$/g BET surface area, 10.2 micron volume median particle size.

Examples 1 and 2 demonstrate the preparation of curable film-forming compositions according to the present invention. The compositions were prepared by first mixing the separate packs of ingredients, and then combining the packs immediately prior to application to the substrates.

| Ingredient | Example 1: Weight (g) | Example 2: Weight (g) |
| --- | --- | --- |
| A-Pack: | | |
| D8150[1] | 42.1 | 42.1 |
| Amine functional silica[2] | 5.06 | 7.16 |
| D871[1] | 18.5 | 20.0 |
| B-Pack: | | |
| D8371[1] | 15.4 | 15.4 |

[1]Available from from PPG industries, inc.
[2]As described above in Example A

The film forming compositions of Example 1 and 2 were spray applied to a pigmented basecoat to form color-plus-clear composite coatings over primed electrocoated steel panels. The panels used were ACT cold roll steel panels (10.16 cm by 30.48 cm) with ED6060 electrocoat available from ACT Laboratories, Inc. Separate panels were coated with an ENVIROBASE High Performance (EHP) pigmented water-borne basecoat, available from PPG Industries, Inc. Black EHP T407 was hand sprayed using a SATAjet 3000 with WSB fluid nozzle at ambient temperature (about 70° F. (21° C.)). A dry film thickness of about 0.3 to 0.8 mils (about 7 to 20 micrometers) was targeted for the basecoat. The basecoat panels were allowed to flash at ambient temperature (about 70° F. (21' C.)) for at least 15 minutes prior to clearcoat application.

The coating compositions were each hand sprayed using a Devilbiss GTi HVLP spray gun to a basecoated panel at ambient temperature in two coats with an ambient flash between applications. Clearcoats were targeted for a 1.5 to 2.5 mils (about 38 to 64 micrometers) dry film thickness. All coatings were allowed to cure at ambient temperature or air flash for about 20 minutes before being baked. The optional bake was for thirty minutes at 140° F. (60° C.). Seven days after clearcoat application, the coated panels were subjected to DRY ABRASION TEST METHOD ONE and TWO and WET ABRASION TEST METHODS ONE and TWO to determine burnish resistance. Table 1 below illustrates the WET ABRASION TEST METHOD results and Table 2 illustrates the DRY ABRASION TEST METHOD results for the curable film-forming composition of Example 1.

TABLE 1

| Coating | Original 85° Gloss | Gloss after WET ABRASION TEST METHOD ONE | Gloss after WET ABRASION TEST METHOD TWO |
| --- | --- | --- | --- |
| Example 1 | 13.4 | 17.8 | 27 |
| Example 2 | 5.3 | 6.7 | 9.2 |

TABLE 2

| Coating | Original 85° Gloss | Gloss after DRY ABRASION TEST METHOD ONE | Gloss after DRY ABRASION TEST METHOD TWO |
| --- | --- | --- | --- |
| Example 1 | 13.4 | 23.9 | 25.6 |
| Example 2 | 5.3 | 11.0 | 13.6 |

Data in the tables indicate that the curable film-forming compositions of the present invention demonstrate excellent burnish resistance. The Example coatings show a gloss increase of less than 5 gloss units for WET ABRASION TEST METHOD ONE. Also, the Example coatings show a gloss increase of 12.2 gloss units or less for DRY ABRASION TEST METHOD TWO.

The present invention has been described with reference to specific details of particular aspects thereof. It is not intended that such details be regarded as limitations upon the scope of the invention except insofar as and to the extent that they are included in the accompanying claims.

We claim:

1. A method of improving burnish resistance of a substrate, comprising:
    (1) applying to at least a portion of the substrate a curable film-forming composition to form a coated substrate, wherein the curable film-forming composition comprises:
        (a) a polymeric binder comprising at least one polymeric resin having reactive functional groups;
        (b) a curing agent containing functional groups that are reactive with the reactive functional groups of (a) and selected from the group consisting of polyisocyanates, aminoplasts, and combinations thereof; and
        (c) silica particles that have been reacted on their surfaces with aminopropyl trialkoxysilane so as to impart the surfaces with primary amino functional groups thereby forming functionalized silica particles, wherein the functionalized silica particles are prepared from a reaction mixture consisting essentially of fumed or precipitated silica and aminopropyl trialkoxysilane; and (2) (a) heating the coated substrate to a temperature and for a time sufficient to cure the curable film-forming composition or (b) allowing a time sufficient to cure the curable film-forming composition under ambient conditions, wherein after application of the curable film-forming composition to the substrate as a coating and after curing to form a cured coating composition, the cured coating composition demonstrates an initial 85° gloss of less than 30 and an increase in 85° gloss of no more than 10 gloss units when subjected to WET ABRASION TEST METHOD ONE.

2. The method of claim 1 wherein the functionalized silica particles are present in the curable film-forming composition in an amount of 5 to 25 percent by weight, based on the total weight of resin solids in the curable film-forming composition.

3. The method of claim 1, wherein the reactive functional groups of (a) are selected from the group consisting of hydroxyl groups, carbamate groups, carboxyl groups, isocyanate groups, carboxylate groups, primary amine groups, secondary amine groups, amide groups, urea groups, urethane groups, epoxy groups, and combinations thereof.

4. The method of claim 3, wherein the polymeric binder comprises at least one hydroxyl functional acrylic and/or polyester polymer.

5. The method of claim 1, wherein the curing agent comprises a polyisocyanate having free isocyanate functional groups and the curable film-forming composition is a two-package system which is curable at ambient conditions.

6. The method of claim 5 wherein the curing agent comprises a mixture of polyisocyanates derived from isophorone diisocyanate and hexamethylene diisocyanate.

7. The method of claim 1 wherein after application of the curable film-forming composition to the substrate as a coating and after curing to form a cured coating composition, the cured coating composition demonstrates an initial 85° gloss of less than 30 and an increase in 85° gloss of no more than 5 gloss units when subjected to WET ABRASION TEST METHOD ONE.

8. The method of claim 1, wherein after application of the curable film-forming composition to the substrate as a coating and after curing to form a cured coating composition, the cured coating composition demonstrates an initial 85° gloss of less than 30 and an increase in 85° gloss of no more than 15 gloss units when subjected to WET ABRASION TEST METHOD TWO.

9. The method of claim 1, wherein said film-forming composition is solventborne.

10. The method of claim 1, wherein the functionalized silica particles are prepared from a reaction mixture consisting essentially of precipitated silica and aminopropyl trialkoxysilane.

11. A method of improving burnish resistance of a substrate, comprising:
(1) applying to at least a portion of the substrate a first curable film-forming composition to form a colored base coat;
(2) applying a second, transparent, film-forming composition on top of the base coat to form a clear top coat, wherein the transparent film-forming composition comprises a curable film-forming composition comprising:
(a) a polymeric binder comprising at least one polymeric resin having reactive functional groups;
(b) a curing agent containing functional groups that are reactive with the reactive functional groups of (a) and selected from the group consisting of polyisocyanates, aminoplasts, and combinations thereof; and
(c) silica particles that have been reacted on their surfaces with aminopropyl trialkoxysilane so as to impart the surfaces with primary amino functional groups thereby forming functionalized silica particles, wherein the functionalized silica particles are prepared from a reaction mixture consisting essentially of fumed or precipitated silica and aminopropyl trialkoxysilane; and
(3) (a) heating the substrate after step (2) to a temperature and for a time sufficient to cure the second, transparent, film-forming composition or (b) after step (2) allowing a time sufficient to cure the second, transparent, film-forming composition under ambient conditions, wherein after application of the second, transparent, film-forming composition on top of the base coat and after curing to form a cured coating composition, the cured coating composition formed from the second, transparent, film-forming composition demonstrates an initial 85° gloss of less than 30 and an increase in 85° gloss of no more than 10 gloss units when subjected to WET ABRASION TEST METHOD ONE.

12. The method of claim 11 wherein the functionalized silica particles are present in the second, transparent, film-forming composition in an amount of 5 to 25 percent by weight, based on the total weight of resin solids in the second, transparent, film-forming composition.

13. The method of claim 11, wherein the reactive functional groups of (a) are selected from the group consisting of hydroxyl groups, carbamate groups, carboxyl groups, isocyanate groups, carboxylate groups, primary amine groups, secondary amine groups, amide groups, urea groups, urethane groups, epoxy groups, and combinations thereof.

14. The method of claim 11, wherein the polymeric binder comprises at least one hydroxyl functional acrylic and/or polyester polymer.

15. The method of claim 11, wherein the curing agent comprises a polyisocyanate having free isocyanate functional groups and the second, transparent, film-forming composition is a two-package system, curable at ambient conditions.

16. The method of claim 15 wherein the curing agent comprises a mixture of polyisocyanates derived from isophorone diisocyanate and hexamethylene diisocyanate.

17. The method of claim 11, wherein after application of the second, transparent, film-forming composition on top of the base coat and after curing to form a cured coating composition, the cured coating composition formed from the second, transparent, film-forming composition demonstrates an initial 85° gloss of less than 30 and an increase in 85° gloss of no more than 5 gloss units when subjected to WET ABRASION TEST METHOD ONE.

18. The method of claim 11, wherein after application of the second, transparent, film-forming composition on top of the base coat and after curing to form a cured coating composition, the cured coating composition formed from the second, transparent, film-forming composition demonstrates an initial 85° gloss of less than 30 and an increase in 85° gloss of no more than 15 gloss units when subjected to WET ABRASION TEST METHOD TWO.

19. The method of claim 11, wherein the second, transparent, film forming composition is solventborne.

* * * * *